(12) United States Patent
Veal et al.

(10) Patent No.: US 8,626,955 B2
(45) Date of Patent: Jan. 7, 2014

(54) DIRECTING PACKETS TO A PROCESSOR UNIT

(75) Inventors: Bryan Veal, Hillsboro, OR (US); Annie Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 12/240,899

(22) Filed: Sep. 29, 2008

(65) Prior Publication Data
US 2010/0083259 A1    Apr. 1, 2010

(51) Int. Cl.
*G06F 15/16* (2006.01)
*G06F 15/173* (2006.01)

(52) U.S. Cl.
USPC .......................................... 709/250; 709/238

(58) Field of Classification Search
USPC ............... 709/213, 226, 231, 238–239, 250; 370/230, 235, 389, 412–413; 710/260
See application file for complete search history.

(56) References Cited

U.S. PATENT DOCUMENTS

| 7,415,035 | B1 | 8/2008 | Muller et al. | |
|---|---|---|---|---|
| 2005/0060462 | A1* | 3/2005 | Ota | 710/260 |
| 2005/0080923 | A1* | 4/2005 | Elzur | 709/238 |
| 2007/0038818 | A1 | 2/2007 | Greenfield et al. | |
| 2007/0070904 | A1* | 3/2007 | King et al. | 370/235 |
| 2007/0230489 | A1* | 10/2007 | Cornett et al. | 370/412 |
| 2008/0002724 | A1* | 1/2008 | Grewal et al. | 370/401 |
| 2009/0182836 | A1* | 7/2009 | Aviles et al. | 709/213 |

FOREIGN PATENT DOCUMENTS

| WO | 2008/002945 A1 | 1/2008 |
|---|---|---|
| WO | 2010/036656 A2 | 4/2010 |
| WO | 2010/036656 A3 | 6/2010 |

OTHER PUBLICATIONS

International Preliminary Report on Patentability for International Patent Application No. PCT/US2009/057881, Mailed Apr. 7, 2011, 6 pages.
International Search Report and Written Opinion for International Patent Application No. PCT/US2009/057881, Mailed Apr. 12, 2010, 11 pages.
Veal, Bryan et al., "Performance Scalability of a Multi-Core Web Server", ANCS '07, Dec. 3-4, 2007, Orlando, FL, 10 pages, ref pp. 57-66.
Supplemental European Search Report received for European Patent Application No. 09816762.0 mailed on Oct. 9, 2012, 11 pages of Supplemental Search Report.
Cline et al. "TCP Onloading for Data Center Servers" vol. 37, Issue 11, Nov. 1, 2004, pp. 46-56.

* cited by examiner

*Primary Examiner* — Peling Shaw

(57) ABSTRACT

A computer system may comprise a plurality of cores that may process the tasks determined by the operating system. A network device may direct a first set of packets to a first core using a flow-spreading technique such as receive side scaling (RSS). However, the operating system may re-provision a task from the first core to a second core to balance the load, for example, on the computer system. The operating system may determine an identifier of the second core using a new data field in the socket calls to track the identifier of the second core. The operating system may provide the identifier of the second core to a network device. The network device may then direct a second set of packets to the second core using the identifier of the second core.

22 Claims, 4 Drawing Sheets

DIRECTING PACKETS TO A PROCESSOR UNIT

BACKGROUND

A processing unit of a computer system may comprise multiple processing cores. The cores may comprise execution units exposed by the architecture. The computer system may be coupled to other computer systems and may transfer data units to the other computer systems. As the data transfer speeds increase (e.g., 10 Giga-bit per second), the tasks that consume the data units may be scheduled, dynamically. The scheduling policy of the operating system (OS) may transfer the task supported by a first core to a second core to balance the load. However, flow-spreading or mapping techniques such as receive side scaling (RSS) may direct the data units to the first core, which may not be supporting tasks that require the data units. Such a mismatch may degrade the performance of the computer system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes directing data units to a core supporting tasks. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
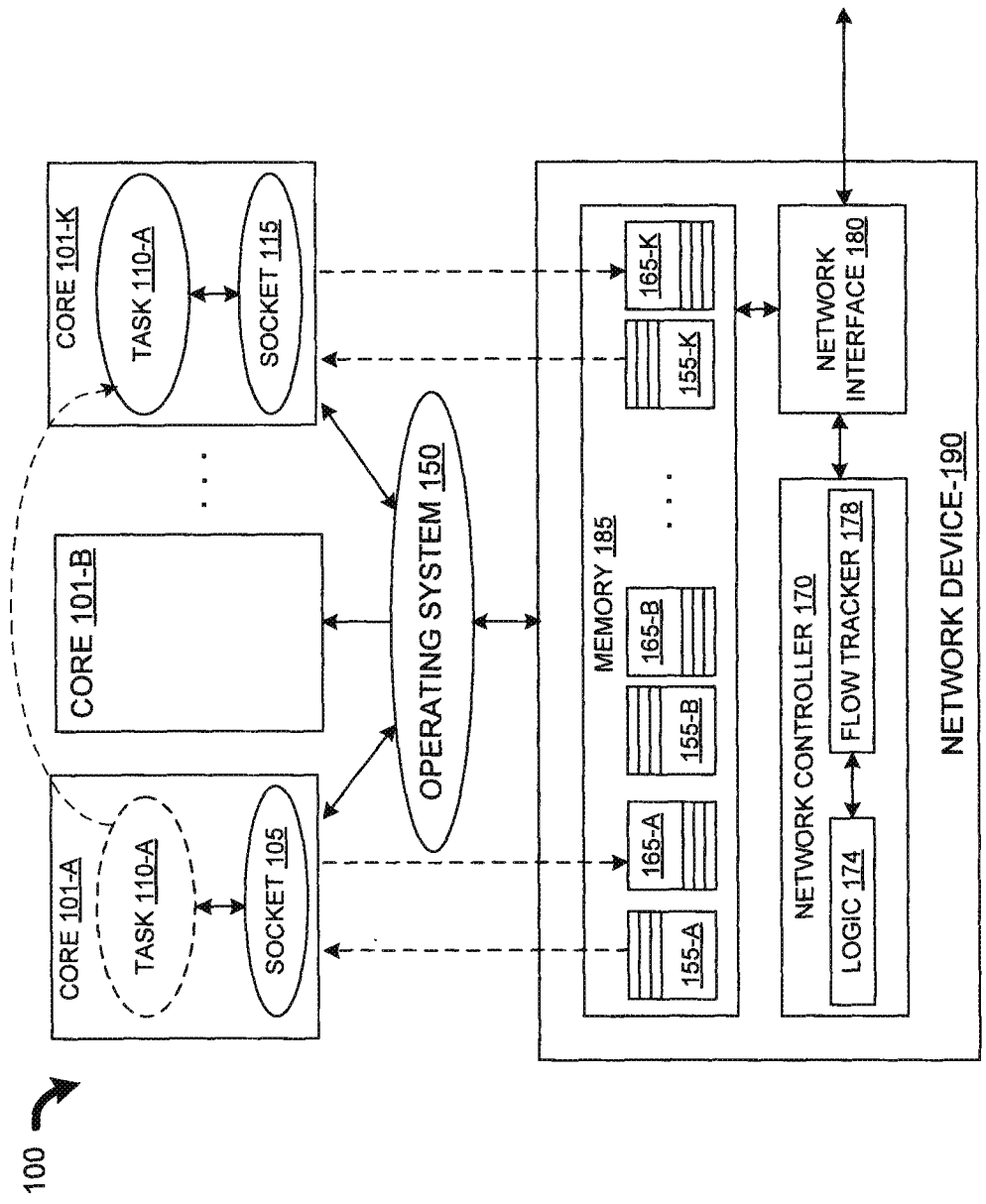
FIG. 1 illustrates a computer platform 100 in accordance with an embodiment.

An embodiment of a computer platform 100 is illustrated in FIG. 1. The computing platform 100 may comprise a plurality of processing cores such as core 101-A, 101-B, and 101-K, an operating system 150, and a network device 190.

In one embodiment, the cores 101 may support one or more applications such as file transfer protocol (ftp), or e-mail, or Telnet. In one embodiment, the cores 101 may provision resources to execute tasks of the application. In one embodiment, the core 101 may represent a fine-grained unit of execution exposed by the architecture and may comprise a hardware thread, a core, a central processing unit (CPU), and similar other units. In one embodiment, the core 101-A may support a task 110-A. In one embodiment, the task 110-A while provisioned on the core 101-A may use a socket 105 to communicate with the operating system 150.

In one embodiment, the task 110-A, which initially was provisioned on the core 101-A may be re-provisioned or rescheduled from the core 101-A to core 101-K, for example. In one embodiment, the re-provisioning may occur in response to receiving a signal from the operating system 150. In one embodiment, the re-provisioned task 110-A supported by the core 101-K may use a socket 115 to communicate with the operating system 150. In one embodiment, socket 105 and 115 may support data structures, which may track characteristics and state of a flow. In one embodiment, the sockets 105 and 115 may comprise a new data structure such as a CID tracking data field to track the identifier of the core (Core ID), which supports the task 110. In one embodiment, the socket 105 may provide the identifier of the core 101-A as the CID while the task 110-A is supported by the core 101-A. After re-provisioning the task 110-A from the core 101-A to 101-K, the socket 115 may provide the identifier of the core 101-K as the CID.

In one embodiment, the operating system 150 may manage the processing resources of the cores 101-A to 101-K. In one embodiment, the OS 150 may schedule the hardware resources such as the threads to perform a task of an application. In one embodiment, at a first time point, the operating system 150 may schedule the task 110-A of an application on the core 101-A. At a second time point, the operating system 150 may re-provision or reschedule the task 110-A from the core 101-A to 101-K by sending a re-provisioning signal to the core 101-A and 101-K. In one embodiment, the OS 150 may re-provision the task 110-A from the core 101-A to 101-K to balance the load of the computing system 100. In one embodiment, the OS 150 may use resource scheduling policies to provision and re-provision the tasks to balance the load of the computer platform 100.

In one embodiment, the operating system 150 may use sockets such as 105 and 115 as an interface between the application and the network. In one embodiment, the operating system 150 may extract the core identifier (CID) stored in the CID data field of a socket system call and may provide the CID to the network device 190. In one embodiment, the socket system call may be initiated by a resource supporting the task 110-A.

In one embodiment, the network device 190 may comprise a network controller 170, a network interface 180, and a memory 185. In one embodiment, the network interface 180 may couple the computing system 100 to a network. In one embodiment, the network interface 180 may receive incoming data units from the network and store the incoming data units to a buffer indicated by the buffer details provided by the network controller 170. In one embodiment, the network interface 180 may store the incoming data units in a buffer 155-A based on the buffer details received from the network controller 170. In one embodiment, the incoming data units stored in the buffer 155-A may be retrieved by the core 101-A. In one embodiment, the network interface 180 may transfer the outgoing data units stored in the buffer 165-A to the network.

In one embodiment, the network controller 170 may comprise logic 174 and a flow tracker 178. In one embodiment, the flow tracker 178 may adopt techniques to reduce the storage requirement of a flow table, which may store flow-to-core mapping. In one embodiment, the flow tracker 178 may adopt techniques such as combining flow table with a RSS indirection table created using flow spreading techniques such as receive side scaling (RSS). In one embodiment, such combining techniques may use the flow table as an exception to RSS results. In other embodiment, the flow tracker 178 may use replacement policies such as least recently used (LRU) to replace the aged entries with the new entries. In yet other embodiment, the flow tracker 178 may use set associativity techniques to trade-off between complexity and performance to store the entries in the flow table. In one embodiment, the search results of the flow table may provide the core identifier to which the incoming data units may be sent.

In one embodiment, the logic 174 may use flow-spreading or mapping techniques such as receive side scaling (RSS) to determine the destination core to which the first set of data units may be sent. In one embodiment, the logic 174 may use RSS technique to determine that the first set of data units may be sent to the core 101-A. In one embodiment, the logic 174 may provide buffer details to the network interface 180 that provide details of the buffer 155-A into which the incoming data units may be stored.

In one embodiment, the logic 174 may receive a CID from the operating system 150. In one embodiment, the CID may indicate the identifier of the core, which may support the re-provisioned task. In one embodiment, the logic 174 may receive a CID comprising the identifier of the core 101-K. In one embodiment, the logic 174 may determine the buffers associated with the core 101-K and may send the buffer details to the network interface 180. In one embodiment, the logic 174 may determine that the buffer 155-K and 165-K are associated with the core 101-K and may send the starting address of the buffer 155-K for storing incoming data units.

In one embodiment, such an approach may cause the incoming data units to reach the core 101-K, which supports the task 110-A. In one embodiment, the task 110-K may be the consumer of the incoming data units. As a result of directing the data units to the core, which consumes the data units, the performance of the computer platform 100 may be enhanced.

Figure 2:
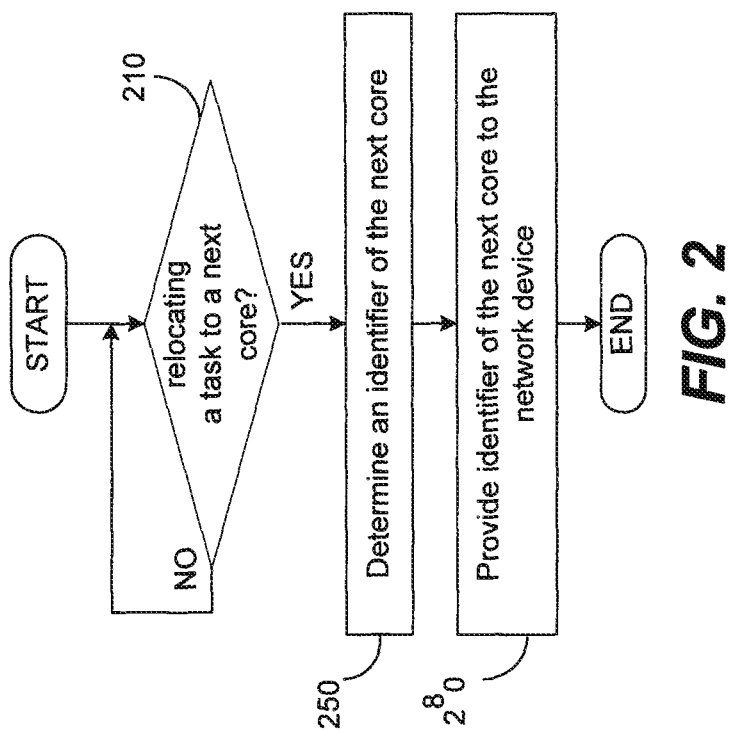
FIG. 2 illustrates an operation of an operating system, which may cause the data units to be directed to a core supporting tasks in accordance with an embodiment.

An operation of the operating system 150, which may cause the data units to be directed to the core 101-K in accordance with an embodiment, is illustrated in FIG. 2.

In block 210, the operating system 150 may check if the task 110-A performing a task is to be relocated to a next core and control passes to block 250 if the task is to be re-provisioned. In one embodiment, the OS 150 may check if the task 110-A is to be re-provisioned from the core 110-A to 110-K. In one embodiment, the OS 150 may determine that the task 110-A is to be re-provisioned to the core 101-K in accordance with a scheduling policy to balance the workload. In one embodiment, control may pass to block 250.

In block 250, the OS 150 may determine an identifier of the next core (CID). In one embodiment, the OS 150 may determine the identifier of the next core using the socket calls made by the task 110-K. In one embodiment, the socket 115 may support data fields that determine or track the identifier of the core supporting the task 101-K. In one embodiment, the OS 150 may determine the identifier of the core 101-A as the core 101-K is supporting the task 110-K, which is re-provisioned.

In block 280, the OS 150 may provide the identifier of the next core to the network device 190. In one embodiment, the OS 150 may provide the identifier of the core 101-K to the network device 190.

Figure 3:
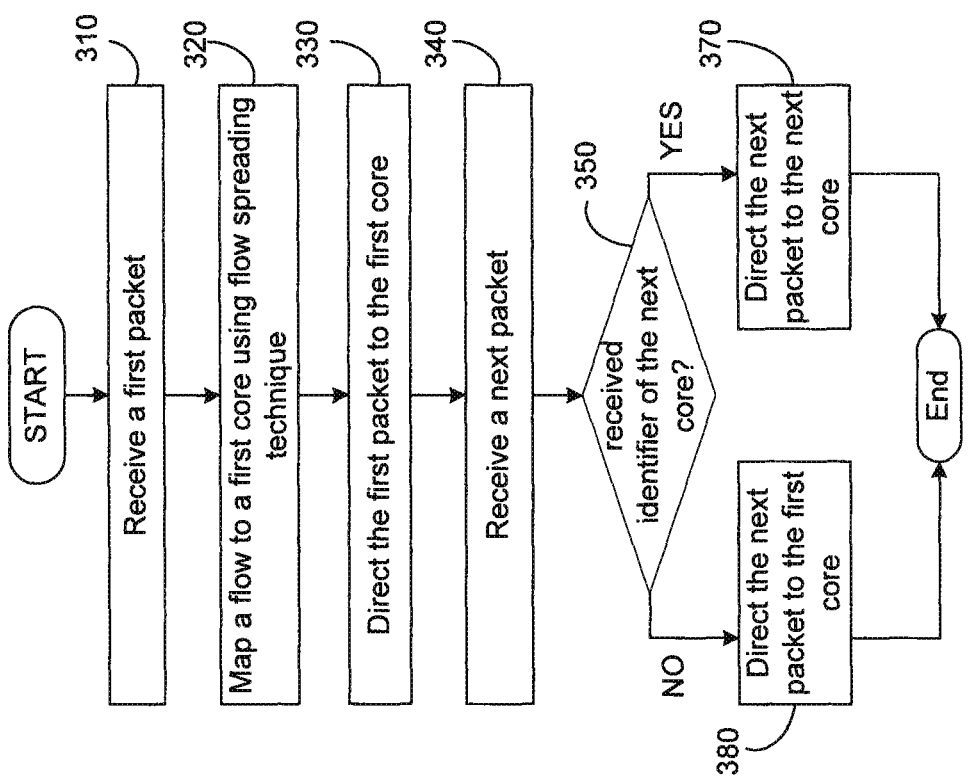
FIG. 3 illustrates an operation of the network device, which may direct the data units to a core supporting tasks in accordance with an embodiment.

An operation of the network device 190, which may direct the data units to the next core supporting the task in accordance with an embodiment, is illustrated in FIG. 3.

In block 310, the network device 190 may receive a first packet or first set of packets from the network. In block 320, the network device 190 may map a flow, associated with the first packet, to a first core using flow spreading techniques. In one embodiment, the network device 190 may map the first packet or a first set of packets to the core 101-A using receive side scaling (RSS) technique, for example.

In block 330, the network device 190 may direct the first packet or first set of packets to the first core 101-A. In one embodiment, the network device 190 may store the first packet into a buffer 155-A that may be retrieved by the first core 101-A.

In block 340, the network device 190 may receive a next packet or a second set of packets from the network. In block 350, the network device 190 may check if an identifier of the next core is received and control passes to block 370 if the identifier is received and to block 380 otherwise. In one embodiment, the network device 190 may receive the identifier of the next core from the OS 150.

In block 370, the network device 190 may direct the next packet or the second set of packets to the next core 101-K. In block 380, the network device 190 may direct the next packet to the first core 101-A.

Figure 4:
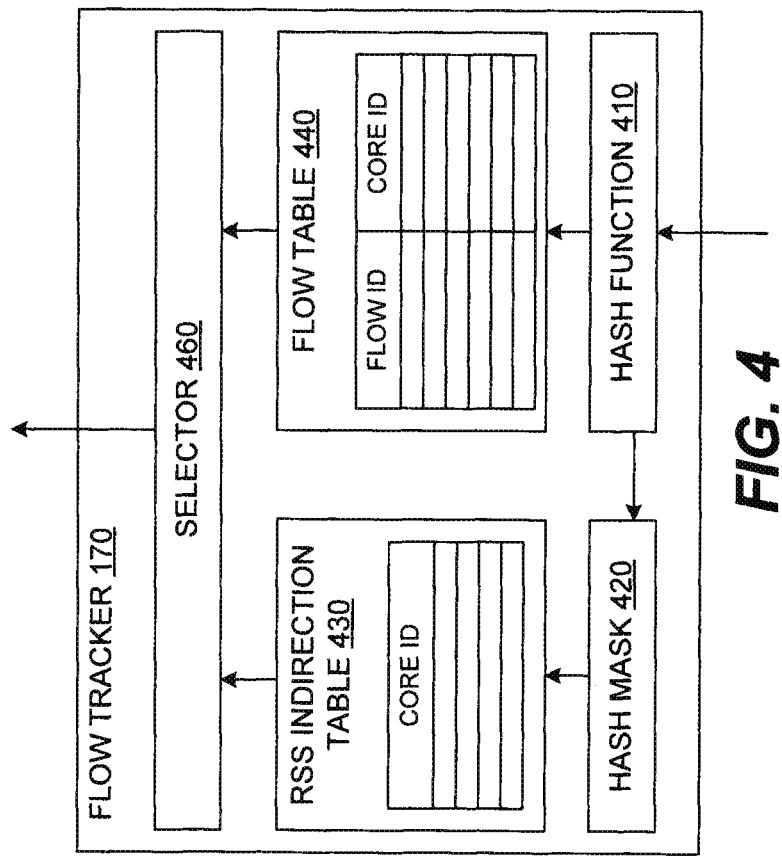
FIG. 4 illustrates a flow tracer, which may efficiently track the flows in the network device in accordance with an embodiment.

A flow tracker 178, which may efficiently track the flow in accordance with an embodiment is illustrated in FIG. 4. In one embodiment, the techniques used in tracking the flow may efficiently store the data. In one embodiment, the flow tracker 178 may comprise a hash function 410, a hash mask 420, a RSS indirection table 430, a flow table 440, and a selector 460.

In one embodiment, the hash function 410 may receive a packet header and extract flow data from the packet. In one embodiment, the flow data may represent a flow identifier (flow ID) included in the packet header.

In one embodiment, the hash mask 420 may receive the flow identifier (flow ID) from the hash function 410 and may generate a table index, which may point to one of the entries in the RSS indirection table 430. In one embodiment, the RSS indirection table 430 may comprise a list of core identifier (core ID 435) populated by the logic 174 using flow-spreading techniques such as receive side scaling.

In one embodiment, entries in the RSS indirection table 430 may map multiple flows to a core and the RSS technique may not effectively track individual flows. Also, changing an entry in the RSS indirection map 430 may remap multiple flows. In one embodiment, the network device 190 may also be provided with a capability to track individual flow to track the flows that changed from the RSS indirection table entries.

In one embodiment, the flow table 440 may comprise two fields flow ID 444 and a core identifier (core ID 448). In one embodiment, the flow table 440 may be populated by the logic 174 using the core identifiers received from the OS 150. In one embodiment, the flow table 440 may map individual flows to a core. In one embodiment, a new entry in the flow table 440 may be created in response to receiving a core identifier from the OS 150.

In one embodiment, for an incoming packet, the selector 460 may match the flow ID with the entries in the flow table 440 and on detecting a match for the flow ID, an associated core ID may be selected. In one embodiment, the selected core ID may be used to direct the packet to the core 101-K, for example. In one embodiment, the selector 460 may use the RSS indirection table 430 to determine the core ID if no match is found to the flow ID extracted from the packet header. In one embodiment, the selector 460 may select the core ID indicated by the table entry generated by the hash mask 420.

Figure 5:
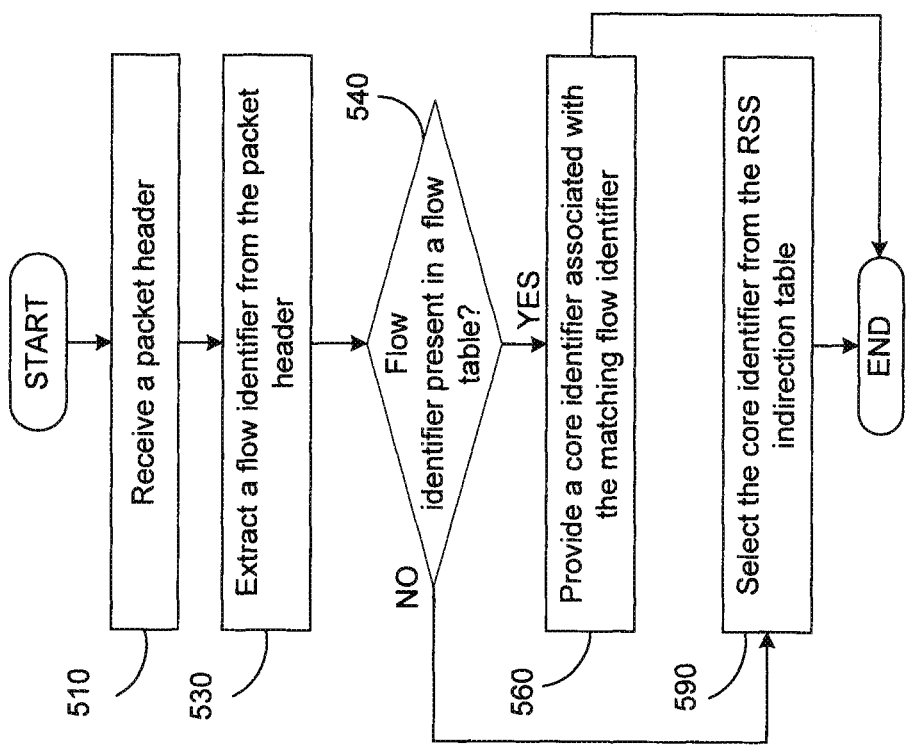
FIG. 5 illustrates an operation of the flow tracer, which may efficiently track the flows in the network device in accordance with an embodiment.

The operation of a flow tracker 170, which may be used to direct the packet to a core supporting a task in accordance with an embodiment is illustrated in FIG. 5.

In block 510, the hash function 410 may receive a packet and extract a packet header from the packet. In block 530, the hash function 410 may extract a flow identifier (flow ID) from the packet header.

In block 540, the selector 460 may check if the flow identifier is present in the flow table 440 and control passes to block 560 if the flow identifier is present in the flow table 440 and to block 590 otherwise.

In block 560, the selector 460 may provide a core identifier associated with the matching flow identifier to the logic 174. In block 580, the selector 460 may provide a core identifier using the RSS indirection table 430 to the logic 174.

In other embodiment, in order to keep the entries in the flow table finite, the entries in the table 440 may be replaced, by the logic 174, using a replacement policy such as the least recently used (LRU) policy. In one embodiment, an entry of the table 440 may be marked as "recently used" if an incoming packet includes a matching flow identifier. In one embodiment, the least recently used active flows may be replaced with new flows as the next incoming packets get mapped to cores. Such an approach may identify ageing of the entries and by replacing the most aged entries, the flow table 440 may be maintained to accommodate the recently used entries.

Figure 6:
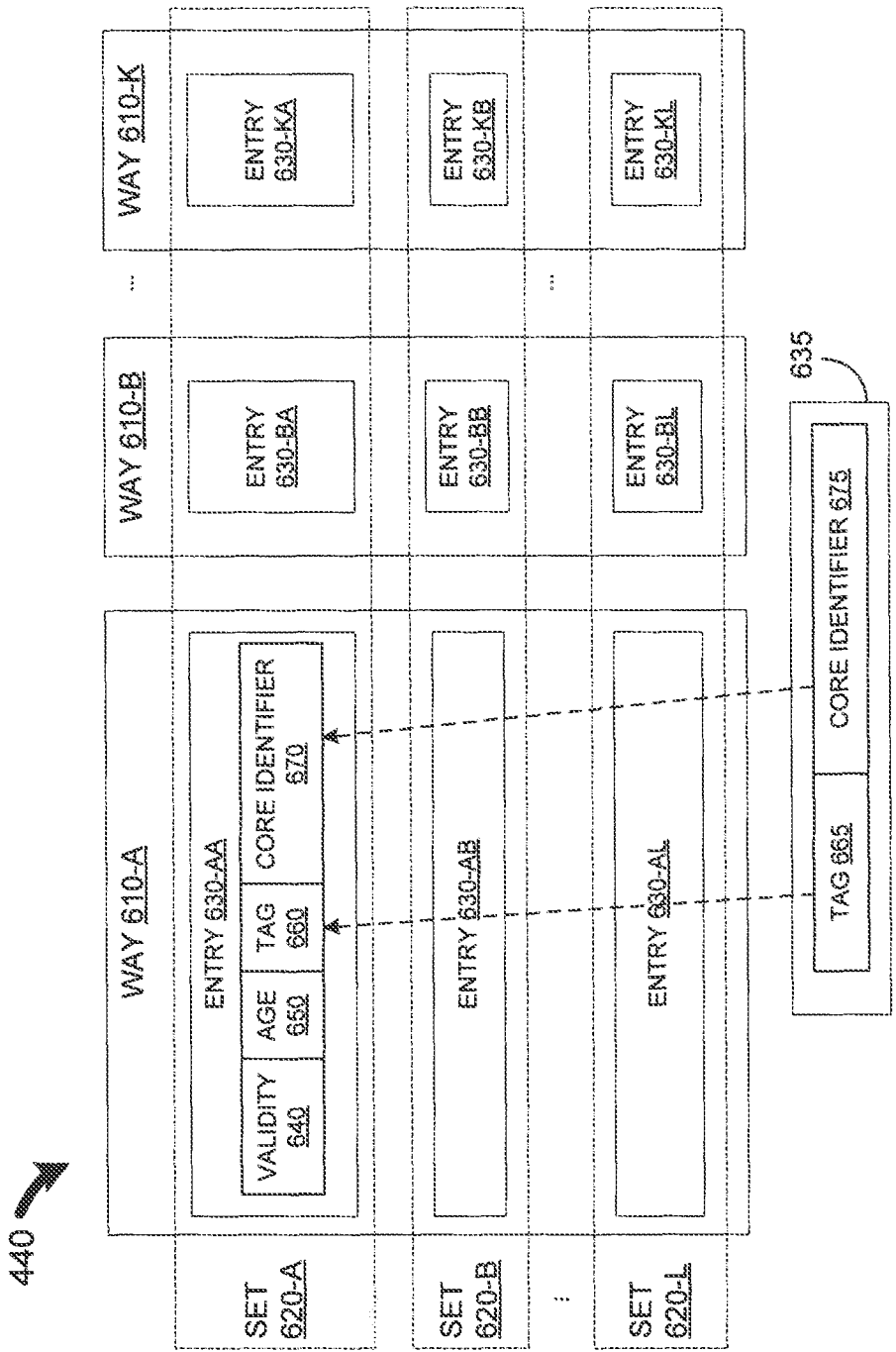
FIG. 6 illustrates a set-associative flow table used to efficiently track the flows in the network device in accordance with other embodiment.

In yet other embodiment, the entries in the table 440 may be stored using set-associativity, illustrated in FIG. 6. In one embodiment, the flow table 440 may comprise one or more ways such as a way 610-A to 610-K and sets such as a set 620-A to 620-L. In one embodiment, the intersection of a way 610 and a set 620 may comprise an entry. In one embodiment, the set 620-A may comprise entries 630-AA to 630-KA in the ways 610-A to 610-K, respectively. Like-wise, a set 620-B may comprise entries 630-AB to 630-KB and a set 620-L may comprise entries 630-AL to 630-KL. In one embodiment, each entry 630 may comprise one or more fields such as validity, age, tag, and core-identifier. In one embodiment, the entry 630-AA may comprise fields such as a validity 640, an age 650, a tag 660, and a core identifier 670.

While replacing the entry 630-AA and updating age 650, the logic 174 may check a limited number of entries 630-AA to 630-KA within the set 620-A. In one embodiment, the sets 620 may be indexed and the entries may be tagged using flow identifier generated using the hash function 410. In one embodiment, using the flow identifier generated from a hash function 410 may provide uniform mapping of flow to the sets 620.

In one embodiment, the network device 190, while directing the packet to the next core as depicted in block 370 of FIG. 3, may generate a new entry 635, for example. The new entry 635 may comprise fields such as tag 665 and/or a core identifier 675 and the values of the new entry 635 may be inserted into the flow table 440. In one embodiment, the new entry 635 may map to one of the sets 620-A to 620-L. In one embodiment, the tag 665 of the new entry 635 may not equal the tag field of any entry in the sets 620-A to 620-L and as a result the validity of at least one set 620 may be marked invalid.

In one embodiment, the logic 174 may replace the tag 660 and the core identifier 670 of an invalid entry 630-AA with the tag 665 and the core identifier 675 of the new entry 635. In one embodiment, the logic 174 may configure the age 650 to a least value to represent that the entry 630-M is a youngest entry (or the most recently updated entry) and may also configure the validity 640 to represent that the new entry 635 has replaced the entry 630-AA. In one embodiment, the logic 174 may replace one of the entries 630 with the new entry 635 and the entry 630 that is to be replaced may be selected based on the value stored in the age fields of the entries 630.

In one embodiment, the entry 630 with oldest age value may be selected for replacement. In one embodiment, if a value in the tag field of the entry 630, selected for replacement, equals a value of the tag of the new entry, the validity value may be retained while replacing the value of the core identifier field of the entry 630 with the core identifier value of the new entry 635. Also, the value of age field may be set to represent that the new entry is the youngest.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A non-transitory computer readable medium containing instructions, which when executed, cause a processor to:
store data associating respective packet flows with respective ones of multiple processor units;
store data associating a first packet flow with a first of the multiple processor units;

cause packets in the first packet flow to be directed to the first of the multiple processor units based on the data associating the first packet flow with the first of the multiple processor units;
determine a second, different, one of the multiple processor units based on a socket call, the socket corresponding to the first packet flow, the socket call to determine an id of the second, different, one of the multiple processor units;
store data to associate the first packet flow with the second of the multiple processor units;
cause packets in the first packet flow to be directed to the second of the multiple processor units based on the data associating the first packet flow with the second of the multiple processor units determined to be associated with the socket call; and
if a packet belongs to a packet flow not represented in the data associating respective packet flows with respective ones of multiple processor units, causing the packet to be directed to a one of the multiple processor units based on a receive side scaling indirection table indexed by a hash of packet header flow data, wherein the receive side scaling indirection table is capable of mapping multiple packet flows to the same receive side scaling indirection table entry.

2. The medium of claim 1, wherein the socket call comprises an operating system call invoked in response to an application executed by the second one of the multiple processor units.

3. The medium of claim 1, wherein the instructions, which when executed, cause the processor to determine a second, different, one of the multiple processor units associated with the socket call comprise instructions which when executed, cause the processor to determine a unit id.

4. The medium of claim 1, wherein the instructions, which when executed, cause the processor to cause packets in the packet flow to be directed to the first of the multiple processor units comprise instructions, which when executed, cause the processor to perform a hash operation on flow id data in a packet header.

5. The medium of claim 1, wherein the instructions, which when executed, cause the processor to re-provision an application from the first of the multiple processor units to the second of the multiple processor units, the application to cause the socket call to be invoked.

6. The medium of claim 1, wherein the multiple processor units comprise multiple respective processor cores.

7. The medium of claim 1, wherein the instructions, which when executed, cause the processor to store data to associate the packet flow with the second of the multiple processor units comprise instructions to store data based on data included in a packet header and an associated id of the second of the multiple processor units.

8. A device, comprising circuitry to:
store data associating respective packet flows with respective ones of multiple processor units;
store data associating a first packet flow with a first of the multiple processor units;
cause packets in the first packet flow to be directed to the first of the multiple processor units based on the data associating the first packet flow with the first of the multiple processor units;
determine a second, different, one of the multiple processor units based on a socket call, the socket corresponding to the first packet flow, the socket call to determine an id of the second, different, one of the multiple processor units;
store data to associate the first packet flow with the second of the multiple processor units;
cause packets in the first packet flow to be directed to the second of the multiple processor units based on the data associating the first packet flow with the second of the multiple processor units determined to be associated with the socket call; and
if a packet belongs to a packet flow not represented in the data associating respective packet flows with respective ones of multiple processor units, cause the packet to be directed to a one of the multiple processor units based on a receive side scaling indirection table indexed by a hash of packet header flow data, wherein the receive side scaling indirection table is capable of mapping multiple packet flows to the same receive side scaling indirection table entry.

9. The device of claim 8, wherein the socket call comprises an operating system call invoked in response to an application executed by the second one of the multiple processor units.

10. The device of claim 8, wherein circuitry to determine a second, different, one of the multiple processor units associated with the socket call comprises circuitry to determine a unit id.

11. The device of claim 8, wherein circuitry to cause packets in the packet flow to be directed to the first of the multiple processor units comprises circuitry to perform a hash operation on flow id data in a packet header.

12. The device of claim 8, wherein the multiple processor units comprise multiple respective processor cores.

13. The device of claim 8, wherein the circuitry to store data to associate the packet flow with the second of the multiple processor units comprises circuitry to store data based on data included in a packet header and an associated id of the second of the multiple processor units.

14. The device of claim 8, wherein the device comprises a network interface controller.

15. The device of claim 8, wherein the device comprises the multiple processor units.

16. A method comprising:
storing data associating respective packet flows with respective ones of multiple processor units;
storing data associating a first packet flow with a first of the multiple processor units;
causing packets in the first packet flow to be directed to the first of the multiple processor units based on the data associating the first packet flow with the first of the multiple processor units;
determining a second, different, one of the multiple processor units based on a socket call, the socket corresponding to the first packet flow, the socket call to determine an id of the second, different, one of the multiple processor units;
storing data to associate the first packet flow with the second of the multiple processor units;
causing packets in the first packet flow to be directed to the second of the multiple processor units based on the data associating the first packet flow with the second of the multiple processor units determined to be associated with the socket call; and
if a packet belongs to a packet flow not represented in the data associating respective packet flows with respective ones of multiple processor units, causing the packet to be directed to a one of the multiple processor units based on a receive side scaling indirection table indexed by a hash of packet header flow data, wherein the receive side scaling indirection table is capable of mapping multiple packet flows to the same receive side scaling indirection table entry.

17. The method of claim 16, wherein the socket call comprises an operating system call invoked in response to an application executed by the second one of the multiple processor units.

18. The method of claim 16, wherein the determining a second, different, one of the multiple processor units associated with a socket call comprises determining a unit id.

19. The method of claim 16, wherein the causing packets in the packet flow to be directed to the first of the multiple processor units comprises causing a hash operation on flow id data in a packet header.

20. The method of claim 16, further comprising re-provisioning an application from the first of the multiple processor units to the second of the multiple processor units, the application to cause the socket call to be invoked.

21. The method of claim 16, wherein the multiple processor units comprise multiple respective processor cores.

22. The method of claim 16, wherein the storing data to associate the packet flow with the second of the multiple processor units comprises storing data based on data included in a packet header and an associated id of the second of the multiple processor units.

* * * * *